United States Patent [19]

Grossman

[11] Patent Number: 4,981,562

[45] Date of Patent: Jan. 1, 1991

[54] ELECTROLYTIC RECOVERY OF MERCURY ENRICHED IN ISOTOPIC ABUNDANCE

[75] Inventor: Mark W. Grossman, Belmont, Mass.

[73] Assignee: GTE Products Corporation, Danvers, Mass.

[21] Appl. No.: 289,850

[22] Filed: Dec. 23, 1988

[51] Int. Cl.$^5$ ............................................... C25C 1/16
[52] U.S. Cl. ............................ 204/105 R; 204/157.2; 204/157.21; 204/157.4
[58] Field of Search ........... 204/105 R, 157.2, 157.21, 204/157.22, 157.4, 157.41, 157.48, 157.44, 157.5, 157.51

[56] References Cited

U.S. PATENT DOCUMENTS

| | | | |
|---|---|---|---|
| 3,379,252 | 4/1983 | Work | 313/485 |
| 3,897,331 | 7/1975 | Smith et al. | 209/10 |
| 3,983,019 | 9/1976 | Botter nee Bergheaud | 204/157 R |
| 4,149,943 | 4/1979 | Carlin | 204/105 R |
| 4,420,377 | 12/1983 | Shiga et al. | 204/28 |
| 4,514,363 | 4/1985 | Durbin | 423/3 |
| 4,527,086 | 7/1985 | Maya | 313/485 |
| 4,678,550 | 7/1987 | Grossman | 204/105 R |
| 4,713,547 | 12/1987 | Grossman | 250/373 |

FOREIGN PATENT DOCUMENTS 280788 12/1987 European Pat. Off. .
281687 12/1987 European Pat. Off. .

OTHER PUBLICATIONS

Webster and Zare, J. Phys. Chem. 85: 1302–1305 (1981).

Primary Examiner—John F. Niebling
Assistant Examiner—David G. Ryser
Attorney, Agent, or Firm—Ernest V. Linek

[57] ABSTRACT

The present invention is directed to a method of electrolytically extracting liquid mercury from HgO or $Hg_2Cl_2$. Additionally there are disclosed two related techniques associated with the present invention, namely (1) a technique for selectively removing product from different regions of a long photochemical reactor (photoreactor) and (2) a method of accurately measuring the total quantity of mercury formed as either HgO or $Hg_2Cl_2$.

6 Claims, 5 Drawing Sheets

BARE WIRE
COATED WIRE
Hg DROP FORMING
Hg DROP SEPARATED

ELECTROLYTIC RECOVERY OF MERCURY ENRICHED IN ISOTOPIC ABUNDANCE

STATEMENT OF GOVERNMENT INTEREST

The Government of the United States of America has rights in this invention pursuant to Subcontract 4540710 under Prime Contract DE-AC03-76SF00098 awarded by the Department of Energy.

FIELD OF THE INVENTION

The present invention is directed to a method and apparatus useful in the isotopic enrichment of a predetermined isotope of mercury (Hg) from a naturally occurring mercury mixture. While the present invention may be used in the enrichment of any one of the seven naturally occurring isotopes of mercury ($^{202}$Hg, $^{200}$Hg, $^{199}$Hg, $^{201}$Hg, $^{198}$Hg, $^{204}$Hg, and $^{196}$Hg,) it has particularly advantageous application in the enrichment of the $^{196}$Hg isotope, which has a natural abundance of only about 0.146 percent.

BACKGROUND OF THE INVENTION

Many devices utilize mercury in their operation, particularly in the field of electric lamps and lighting. Such devices include arc discharge lamps which typically employ mercury as one of the vaporizable components therein. See, for example, Waymouth, *Electric Discharge Lamps,* MIT Press 1971 for a description of the basic principles of such lamps.

In U.S. Pat. No. 4,379,252, (the '252 patent), the advantages of utilizing higher than normal levels of $^{196}$Hg in the Hg added to fluorescent lamps are described and include unexpectedly high efficiency gains in light output. The disclosure of this patent is hereby incorporated herein by reference.

The drawback of using this isotope lies in its high cost. For example, using conventional enrichment techniques, mercury which has been enhanced to contain about 35% of the $^{196}$Hg isotope can cost about $500 per milligram. While only sub-milligram quantities of this isotope need be added to an incandescent lamp to afford beneficial results, economic realities always play a part in consumer products. Accordingly, it is easy to understand why more economical methods of obtaining this isotope continue to be sought.

Isotopically enriched mercury can be produced by a number of methods. One method involves photosensitized chemical reactions utilizing elemental mercury and various compounds. The compounds HCl and $O_2$ react with mercury atoms when the mercury atoms are excited by resonance radiation, in particular, 2537A radiation produced in a Hg ($^3P$-$^1S_o$) transition generating isotopically selective reactions. Thus, the Hg compound formed contains Hg enriched in a particular isotope, and the Hg must be separated from the compound into its liquid or free state (i.e., elemental Hg) in order to recover the isotopically enriched metal.

Although it has been possible to separate mercury from mercury compounds by a number of techniques, previously employed techniques suffer from significant disadvantages. For example, it has been possible to separate Hg from $Hg_2Cl_2$ via electroless methods using a mixture of methanol and HCl as an electrolyte solution. However, this method produced low yields and the electrolyte solution had a tendency to become contaminated with impurities and to become blackened and corroded.

Hg can also be separated from HgO via thermal decomposition. However, this requires high temperature baking [T>500° C.] and it can easily result in the introduction of trace impurities into mercury. Additionally, vacuum baking at high temperatures requires hardware and techniques that are very complex.

The following additional documents are recited as general background information with respect to the subject matter of the present invention. To the extent deemed necessary by artisans of ordinary skill in the art to which this invention pertains, the teachings of these documents are hereby incorporated herein by reference.

Grossman, U.S. Pat. No. 4,713,547;
Grossman et al., U.S. Pat. No. 4,678,550;
Maya, U.S. Pat. No. 4,527,086;
Durbin, U.S. Pat. No. 4,514,363;
Work et al., U.S. Pat. No. 3,379,252;
Botter nee Bergheaud et al., U.S. Pat. No. 3,983,019;
Smith et al., U.S. Pat. No. 3,897,331;
Grossman et al., U.S. Ser. No. 815,150, filed Dec. 31, 1985;
European Patent Publication No. 0 281 687, published Sept 14, 1988, claiming priority of U.S. Ser. No. 947,217, filed Dec. 29, 1986;
European Patent Publication No. 0 280 788, published Sept. 29, 1988, claiming priority of U.S. Ser. No. 947,216, filed Dec. 29, 1986.

SUMMARY OF THE INVENTION

The present invention is directed to a process for the electrolytic extraction of liquid mercury (elemental Hg) enriched in isotopic abundance with a predetermined isotope of mercury, from mercury compounds produced in a photochemical mercury enrichment reactor. This process comprises the steps of:

(a) providing a photochemical mercury enrichment reactor suitable for the enrichment of a predetermined isotope of mercury;

(b) forming said enriched mercury isotope in said reactor in the form of mercury compounds;

(c) providing a suitable electrolyte solution to said reactor, said electrolyte solution being capable of dissolving said mercury compounds formed in said reactor;

(d) dissolving said mercury compounds in said electrolyte solution to form a saturated solution;

(e) contacting said saturated electrolyte solution with an anode and a moving cathode;

(f) applying a sufficiently high electric current across said anode and cathode, to cause liquid mercury to form on said cathode; and (g) recovering said liquid mercury from said cathode.

Two preferred methods of electrolytically extracting liquid mercury from HgO or $Hg_2Cl_2$ are described. Additionally, product is selectively recovered from different regions of a photochemical reaction vessel used in $^{196}$Hg enrichment.

This invention also provides a unique apparatus for producing isotopically enriched mercury compounds in a reactor and then transporting the dissolved compounds into one or more electrolytic cells where elemental mercury is formed (via reduction) on the cathode. The electrolyte solution is recycled back into the initial reactor where it once again dissolves isotopically enriched mercury compounds.

The process of the present invention permits higher levels of enriched material to be collected than in the usual batch processing. It also permits the measurement of the spatial variation of the level of enrichment (E) and the yield of enriched isotope (Y).

DETAILED DESCRIPTION OF THE PREFERRED EMBODIMENTS

The present invention is directed to the electrolytic recovery of liquid mercury (elemental Hg) from photochemical mercury enrichment reactors. Two preferred embodiments of the electrolytic recovery process of the present invention are described herein.

The first embodiment is based upon the observation that liquid mercury droplets will form at the end of a vertical cathode electrode when a large enough amount of mercury has been deposited during an electrolytic reduction process of mercury ions in solution. By providing a reservoir and value mechanism the liquid mercury can be removed during electrolysis on a semicontinuous basis.

Figure 1:
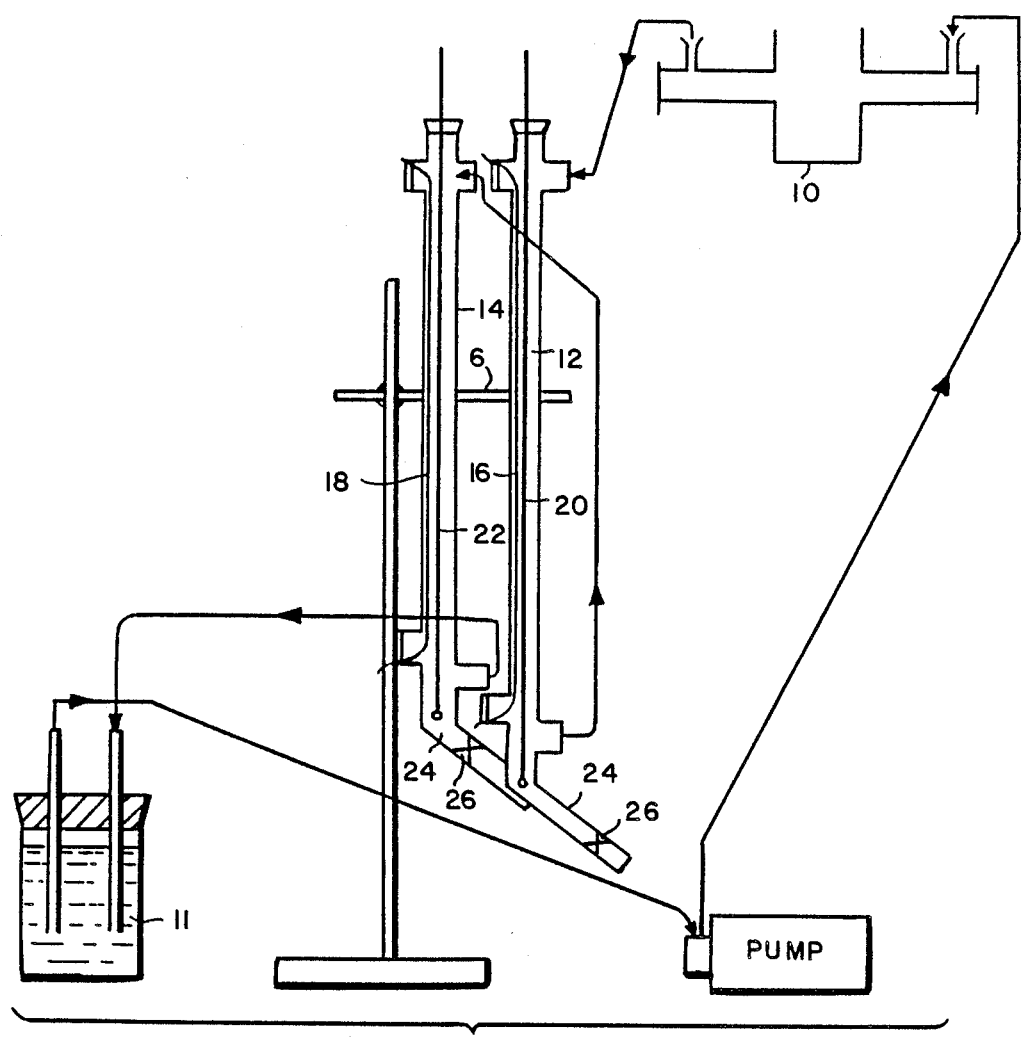
FIG. 1 shows a system for recovering mercury using the first preferred embodiment of the method of the present invention, namely, the falling drop method.

FIG. 1 shows a system for recovering mercury using the first preferred embodiment of the method of the present invention, namely, the falling drop method.

Referring in detail to FIG. 1, there is depicted an apparatus suitable for the electrolytic recovery of mercury from a photochemical process for the enrichment of $^{196}$Hg.

Here the reactor chamber inner walls 10 are coated with $Hg_2Cl_2$ (and in some cases Hg). A circulating electrolyte, preferably ~1M HCl, typically heated to about 50° C., is pumped through the chamber 10 and then into the electrolytic recovery cells 12 and 14. Pump flow rates are controlled so that sufficient contact time occurs between the reactor mercury compounds and the electrolyte solution, resulting in an electrolyte solution saturated with mercury compounds.

During the period in which the electrolyte solution is saturated, very high currents can pass between the anodes 16, 18 and cathodes 20, 22 without greatly affecting the electrolyte or the mercury formed on the cathodes. Currents as high as 0.2 amps have been used for the system shown in FIG. 1.

Figure 2:
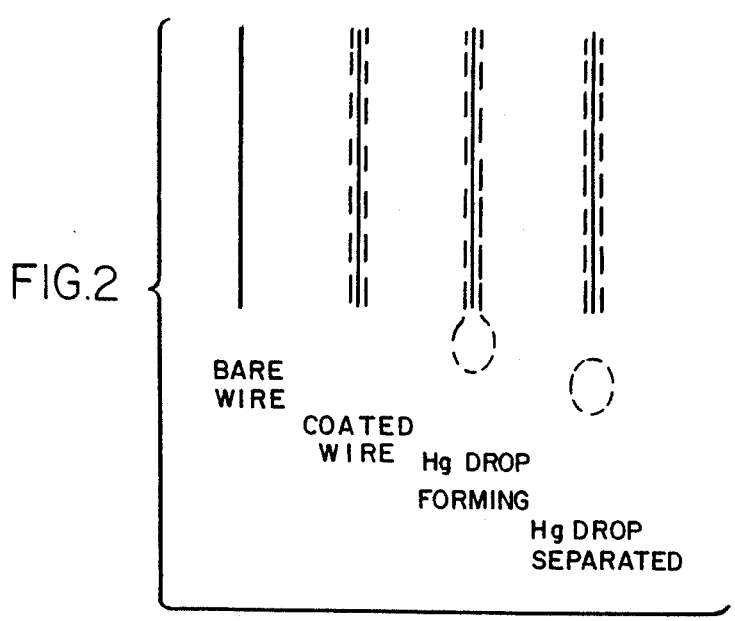
FIG. 2 illustrates the evolution of the Hg cathode coating from the start of the process to the formation of a drop.

FIG. 2 illustrates the evolution of the Hg cathode coating from the start of the process to the formation of a drop. As the process continues more drops form and fall from the wire. The wires are advantageously held in the vertical position, since it is preferably gravitational force which causes the bead to form and eventually fall off the end of the wire.

Referring back to FIG. 1, a drop of mercury (see FIG. 2) passes into a reservoir region 24 which can be accessed via opening a valve 26. The free mercury can thus be removed semi-continuously during the reduction process. This is a particularly useful technique in a multi-pass enrichment process since the formed enriched liquid mercury is to be reused.

Figure 3:
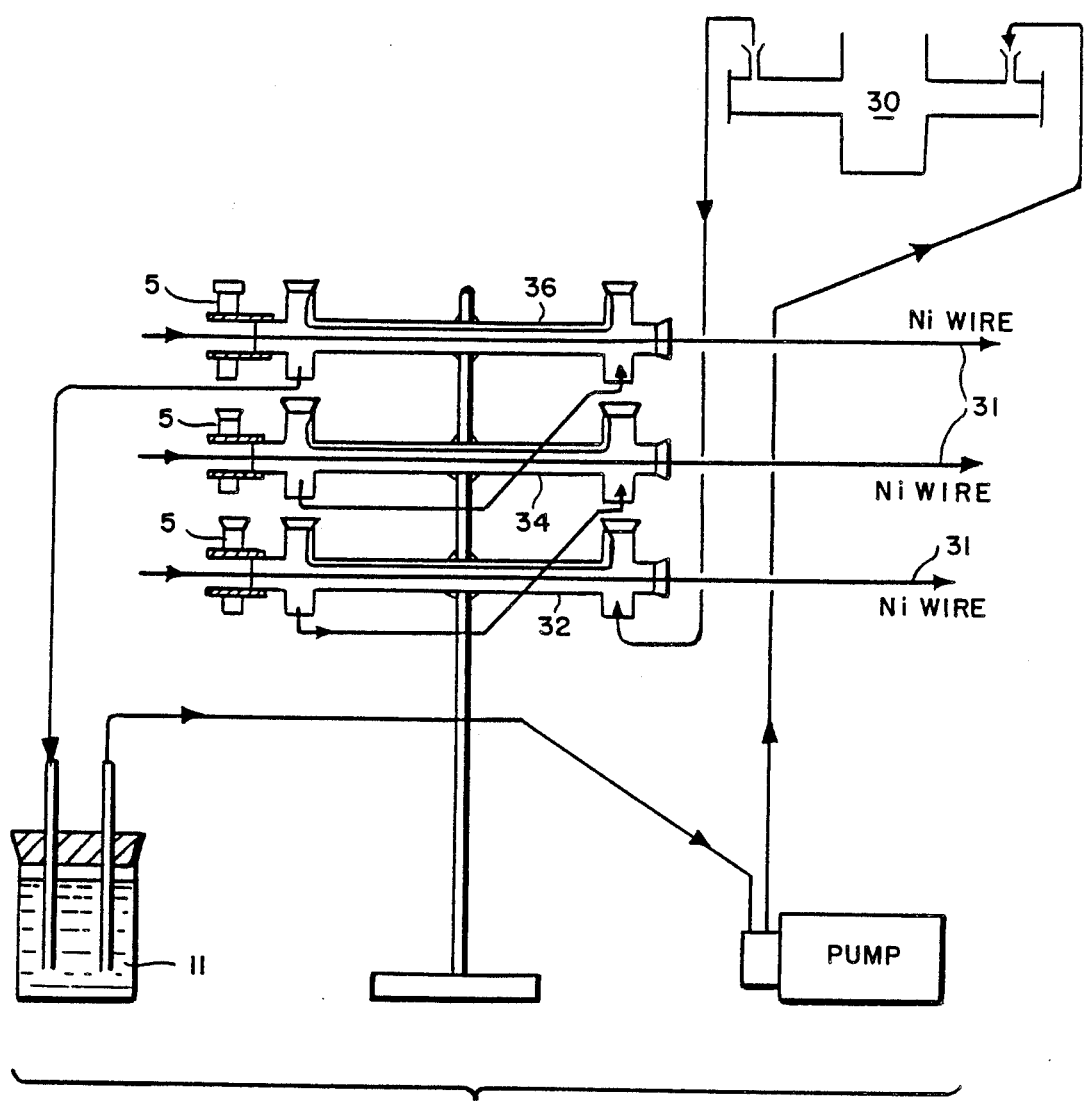
FIG. 3 shows a system for recovering mercury using the second preferred embodiment of the method of the present invention, namely, the moving cathode method.

In a second preferred embodiment for the electrolytic recovery of mercury, reference is made to the apparatus depicted in FIG. 3.

This embodiment of the present invention is based upon the discovery that a continuous cathode wire can be transferred into and simultaneously out of an electrolytic plating bath during mercury deposition.

As depicted, a continuous cathode wire is preferably a long wire, providing many opportunities for use in the apparatus depicted in FIG. 3. Of course, since an infinitely long wire would be impossible to produce, the wire must have a finite length. In the present invention, both long and short wires have been used, and the skilled artisan will readily be able to select either longer or shorter wires (depending upon availability) which will likewise suffice. After a given wire has been exhausted, a new wire is inserted into the electrolytic cell.

After plating, the coated portion of the cathode wire is removed from the bath. The wire can then be cut into pieces, placed into a capsule, the capsule evacuated and sealed, and then the capsule can be used as an enriched mercury dispenser.

In operation, the apparatus of FIG. 3 has a reactor chamber with inner walls 30 which are coated with $Hg_2Cl_2$ (and in some cases Hg). A circulating electrolyte, preferably ~1M HCl, typically heated to about 50° C., is carried through the chamber and then into the electrolytic recovery cells 32, 34 and 36.

Once the segments of the cathode wires, preferably nickel (Ni), within the electrolytic cells 38, 40 and 42 are coated with mercury the electrolysis is stopped momentarily while the clamps 5, shown in FIG. 3, are opened and the coated wires are drawn through their respective cells. Uncoated Ni wire (from the continuous length) enters the cells from the side opposite the removal, and becomes ready to be coated with mercury.

The extracted sections of wire, coated with mercury, are separated from the uncoated section, and the clamp is closed and the electrolysis re-started. The coated wire is rinsed in water, cut and placed into a capsule. The capsule is evacuated and sealed to form a mercury dispenser.

This method is particularly useful in the recovery of product from the final pass of multipass enrichment process.

The electrolytic method of the present invention is especially useful for certain types of photochemical $^{196}$Hg enrichment reactors. These reactors include so-called "long reactors." In a copending application assigned to the assignee of the present application, and filed on even date herewith entitled "High Utilization Photochemical Reactor and Process for $^{196}$Hg Enrichment,"U.S. Ser. No. 289,644, several advantages of the use of long photochemical reactors for $^{196}$Hg enrichment are described. The teachings of this application are hereby incorporated herein by reference.

Figure 4A:
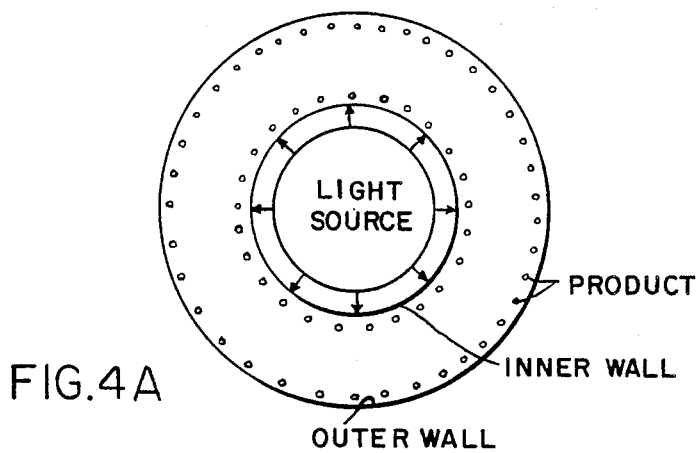
FIGS. 4 and 4A of the present disclosure illustrate one long photoreactor which may benefit from the electrolytic recovery methods of the present invention.
Figure 4:
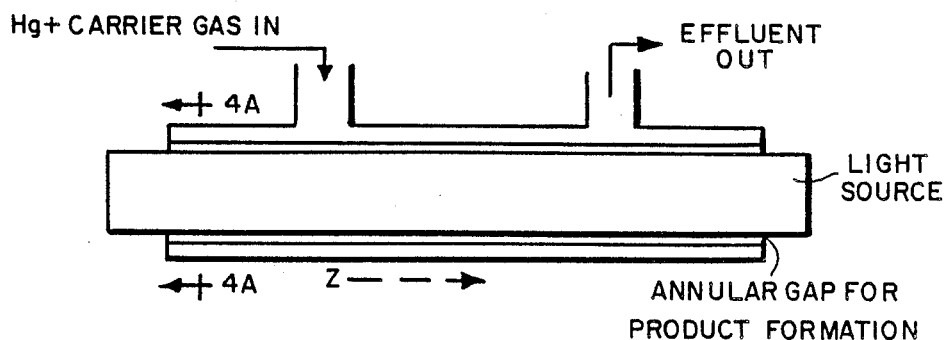

FIGS. 4 and 4A of the present disclosure illustrate one such long reactor. However, in such a reactor the product formation is non-uniform along the z-axis. This has been found due, at least in part, to the depletion in $^{196}$Hg concentration along the flow as the enrichment process proceeds.

Figure 5:
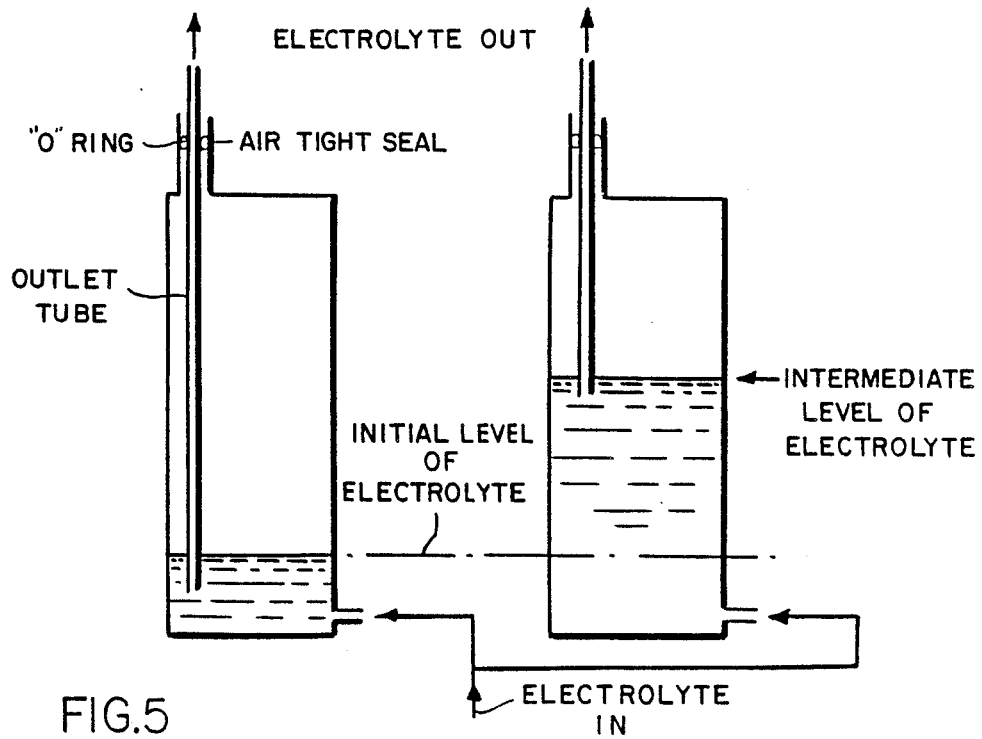
FIG. 5 illustrates the principle of the segmented recovery method of the present invention and illustrates one method of modifying electrolyte levels for the segmented recovery process of the present invention.

In order to investigate a possible axial variation, the present inventors devised a method of removing product from one section of the reactor at a time. FIG. 5 illustrates the principle of this segmented recovery method.

A 1 molar HCl solution as a electrolyte is circulated through the reactor vessel (see Grossman et al., U.S. Ser. No. 815,150, filed Dec. 31, 1985, the disclosure of which is hereby incorporated herein by reference). At each stage of the recovery method the electrolyte is kept at a fixed level so that only the product in contact with the solution is recovered.

After enough time (about 1 hour of plating) to completely dissolve the product and at least partially reduce the mercury from this section of the reactor, the electrolyte is removed and a mercury free batch of electrolyte is used. The level of the electrolyte is raised so that the next section of product is removed. In this way successive sections of the product can be removed.

Figure 7:
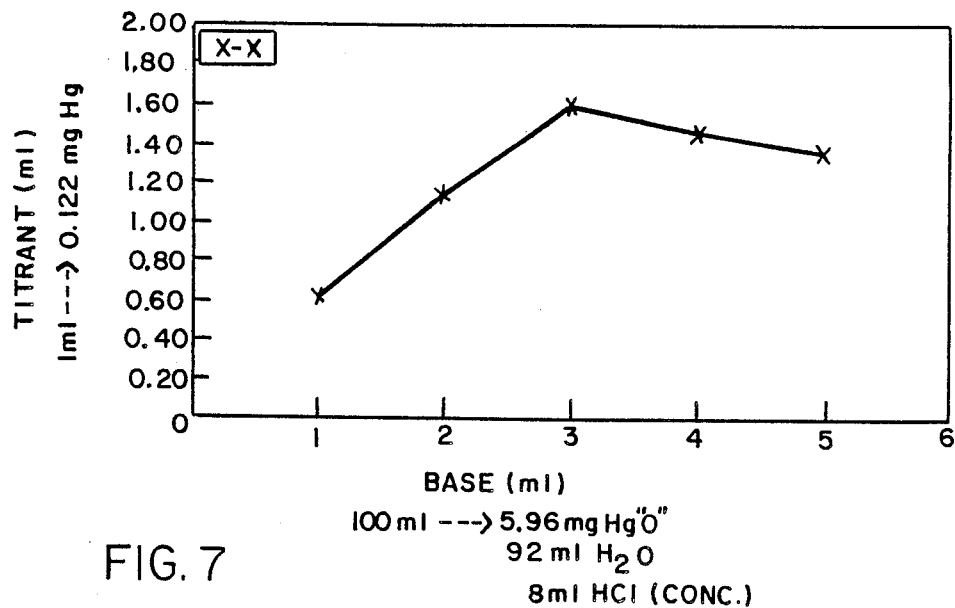
FIGS. 7, 8, and 9 are titration graphs used herein to determine yields of enriched mercury.
Figure 8:
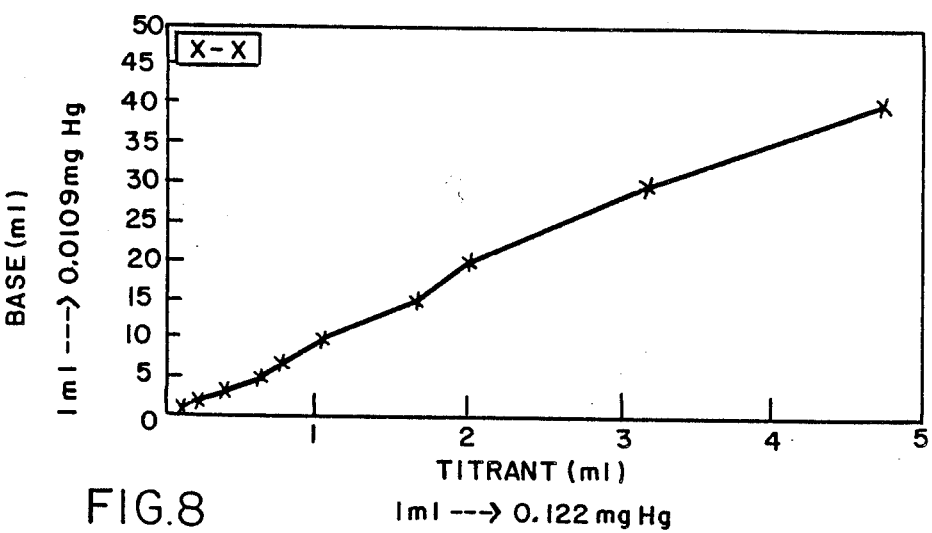

The change in level of the electrolyte is accomplished by changing the position of an outlet tube as shown in FIG. 5. In order to circulate the fluid, the region within the vessel above the fluid must be at a higher pressure than inside the outlet tube. This condition forces the fluid up through the tube. Air tight seals such as indicated in FIGS. 7 and 8 are used in conjuction with a peristaltic pump to create this condition.

Figure 6A:
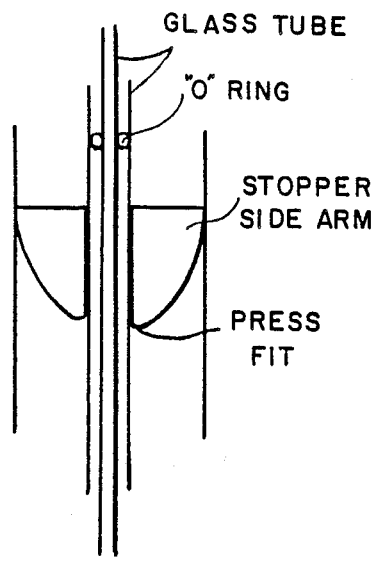
FIGS. 6 A, B, and C illustrate sealing means useful with preferred pumping means for flow of the electrolyte solution in the present process.
Figure 6B:
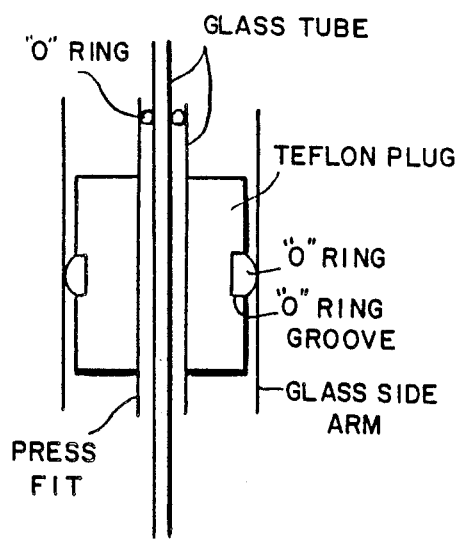
Figure 6C:
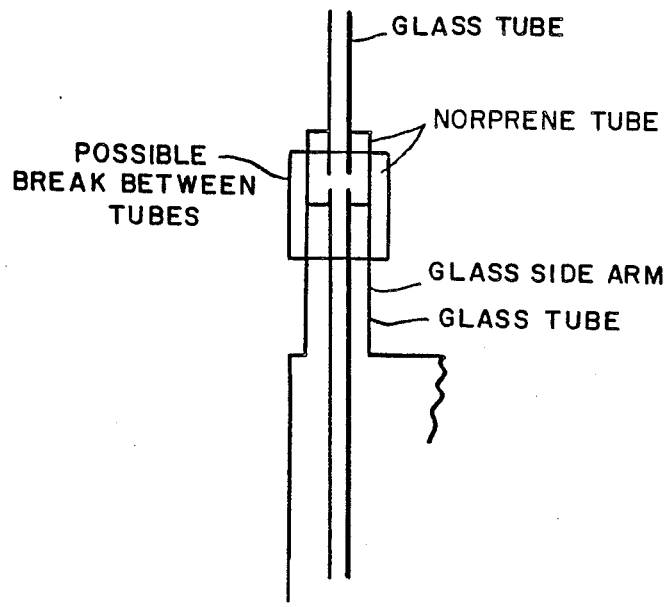

FIGS. 6A, B, and C illustrate various sealing means for controlling the electrolyte flow in the segmented recovery process as illustrated in FIG. 5. FIG. 6A illustrates concentrically arranged glass tubes which fit through a press-fit stopper affording an air-tight fit with slideable movement of the exit tube. FIG. 6B illustrates a variation on the FIG. 6A scheme, wherein a Teflon plug replaces the press-fit stopper. The Teflon plug is retained with an O-ring to assure an air-tight fit. Similarly, FIG. 6C illustrates another version of this exit tube sealing means, using a pair of Norprene tubes to seal the exit system but to retain movement of the exit tube.

Table 1 shows the results of segmented recovery for a reactor shown in FIG. 5. As indicated both Y and E can be measured as a function of Z (the length of the reactor). Note that the very low E value of Delta Z 33-41 cm is unexpectedly low and represents a very low concentration of $^{196}$Hg. This is an example of how segmented recovery can yield important information about a process.

Table 2 shows the results of segmented recovery for a different reactor, which is described in a copending application, assigned to the present assignee, entitled "Axisymmetrical Flow Reactor for $^{196}$Hg Photochemical Enrichment," Attorney Docket No. 38,336, filed on even date herewith. The teachings of this application are hereby incorporated herein by reference.

Very high enrichment for Delta Z 0 to 8 cm suggests a method of obtaining Hg enriched to different levels in $^{196}$Hg. A normal batch method of recovery would not have revealed this high E value and obviously could not provide a means of separating the high E material from the rest of the product.

TABLE 1

Typical Y and E Axial Variations for Non-Uniform Flow Conditions Upstream End

| Delta Z (cm) | 0–8 | 8–16 | 16–24 | 24–33 | 33–41 |
|---|---|---|---|---|---|
| E | 1.634 | 2.068 | 1.966 | 1.025 | 0.309 |
| Y (g/hr) | 0.107 | 0.143 | 0.276 | 0.254 | 0.0705 |

TABLE 2

Typical Y and E Axial Variations for Near Uniform Flow Conditions Upstream End

| Delta Z (cm) | 0–8 | 8–19 | 19–30 | 30–41 |
|---|---|---|---|---|
| E | 13.8 | 7.14 | 2.96 | 2.07 |
| Y (g/hr) | 0.025 | 0.031 | 0.071 | 0.074 |

The photochemical enrichment process yield (Y) is determined by adding together two components, namely, the amount of free mercury recovered plus the amount of mercury still present in the electrolytic bath. The latter component is preferably determined by a novel titration and calibration technique as described below.

As described above, in a direct $^{196}$Hg isotope photochemical enrichment process enriched product is deposited within a vacuum vessel. Using a circulating electrolytic bath mercury is then recovered from the product. In order to determine when this electrolysis should be stopped and what is the total yield, it is necessary to determine how much Hg is left in solution.

To determine the total yield, the amount of free mercury produced in the reduction reaction plus the amount of mercury remaining in solution must be known. In the present invention, it is assumed that the entire product is dissolved into solution, since this is normally true. The total amount of free mercury is determined by weighing and/or Hg bead diameter measurement.

The determination of the amount of Hg remaining in solution turns out to be difficult using standard iodide selective potentiometric titration techniques. There appears to be two major difficulties. First the titrated value is dependent on the HCl concentration as shown in FIG. 7. Here using a standard KI aqueous solution and I$^-$ selective probe (1 ml KI solution—0.122 mg Hg mercury at titration point) it is found that a non-linear dependence of titrant on HCl concentration occurs. This may be related to the fact that Cl$^-$ is an interference ion with this probe.

A second problem occurs due to the difficulty of preparing standard Hg ion concentrations from Hg$_2$Cl$_2$ (believed to be the major product in the photochemical reaction). It was not possible to dissolve this into solutions of HCl (about 1M) at high enough concentrations to produce a set of calibration standards. Rather HgO was dissolved into 1M HCl to produce the calibration standards (denoted as "Base" in FIGS. 8 and 9).

A master solution of 5.87 mg HgO, 0.5 ml HCl (conc.) and 500 ml de-ionized H$_2$O was formed. Thus 1 ml of master solution corresponds to 0.0109 mg Hg. To a certain volume of master solution is added 1 ml of 1M HCl which is than diluted with de-ionized H$_2$O to 200 ml. This corresponds to the "Base" solution which is titrated using a I$^-$ selective probe. The number of ml of "Base" corresponds to the number of ml of master solution. Therefore, the HCl concentration is constant for each of the titrated points in FIGS. 8 and 9. This corresponds to the 1 ml of "Base" solution in FIG. 9 and also corresponds to 1 ml of the electrolytic plating solution normally used in the product recovery process.

Figure 9:
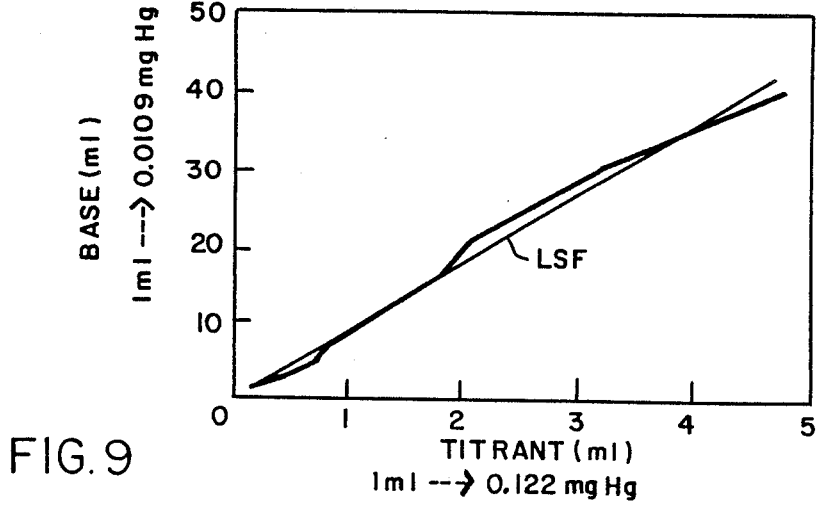

FIG. 9 is a linear least square fit of "Base" (y) versus "Titrant" (x). Written in the form of $y = A_0 + A_1 X$ it is found that $A_0 = 0.095$, $A_1 = 8.862$. Thus 1 ml of titrant corresponds to 8.96 ml of base of 0.0976 mg Hg.

The expected amount would have been 0.122 mg or a 20% over estimate. Converting to mg of Hg the calibration formula becomes:

$$Y_{mg} = A_0^1 + A_1^1 \times ml$$

where
$A_{O1} = 0.0010$
$A_1 = 0.0966$

We have applied this method to four process runs to determine the total yield. These results are shown in Table 3.

TABLE 3

| Run ID | X Amt. Titrant Per ml Bath (ml) | Y Amt. Hg Per ml Bath (mg) | Total Hg in Bath (grams) | Total Product (grams) | Total Yeild (grams/hr) |
|---|---|---|---|---|---|
| 1 | 1.45 | 0.141 | 0.296 | 0.494 | 0.101 |
| 2 | 0.482 | 0.0476 | 0.100 | 0.164 | 0.033 |
| 3 | 1.72 | 0.167 | 0.351 | 0.775 | 0.207 |
| 4 | 1.97 | 0.191 | 0.401 | 0.610 | 0.200 |

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

I claim:

1. A process for the electrolytic extraction of liquid mercury enriched in isotopic abundance with a predetermined isotope of mercury, from mercury compounds produced in a photochemical mercury enrichment reactor, said process comprising the steps of:
   (a) providing a photochemical mercury enrichment reactor suitable for the enrichment of a predetermined isotope of mercury;
   (b) forming enriched mercury in said reactor, in the form of mercury compounds;
   (c) providing a suitable electrolyte solution to said reactor, said electrolyte solution being capable of dissolving said mercury compounds formed in said reactor;
   (d) dissolving said mercury compounds in said electrolyte solution to form a saturated electrolyte solution;
   (e) contacting said saturated electrolyte solution with an anode and a continuous cathode;
   (f) applying a sufficiently high electric current across said anode and said continuous cathode, to cause liquid mercury to form on at least a portion of said continuous cathode; and
   (g) recovering said mercury from the mercury coated portion of said continuous cathode by removing said mercury thereafter introducing an uncoated portion of said continuous cathode to said electrolyte solution.

2. The process of claim 1, wherein said electrolyte solution is recycled to said reactor and the process steps are repeated using the uncoated portion of said continuous cathode.

3. A process of claim 1, wherein the continuous cathode is a metal selected from the group consisting of purified copper, nickel and Niron.

4. A process for the electrolytic extraction of liquid mercury enriched in isotopic abundance with a predetermined isotope of mercury, from mercury compounds produced in a photochemical mercury enrichment reactor, said process comprising the steps of:
   (a) providing a photochemical mercury enrichment reactor suitable for the enrichment of a predetermined isotope of mercury;
   (b) forming an enriched mercury isotope in said reactor in the form of mercury compounds;
   (c) introducing a suitable electrolyte solution to said reactor, said electrolyte solution being capable of dissolving said mercury compounds formed in said reactor;
   (d) dissolving said mercury compounds in said electrolyte solution to form a saturated electrolyte solution;
   (e) contacting said saturated electrolyte solution with an anode and a vertical cathode;
   (f) applying a sufficiently high electric current across said anode and vertical cathode, to cause droplets of liquid mercury to form on at least a portion of said vertical cathode; and
   (g) recovering said mercury droplets from said vertical cathode by collecting said droplets by interrupting the current flow through said vertical cathode.

5. A process of claim 4, wherein the vertical cathode is a metal selected from the group consisting of purified copper, nickel and Niron.

6. A process for the segmented electrolytic extraction of mercury enriched in isotopic abundance with a predetermined isotope of mercury, from mercury compounds produced in a photochemical mercury enrichment reactor, said process comprising the steps of:
   (a) providing a photochemical mercury enrichment reactor suitable for the enrichment of a predetermined isotope of mercury;
   (b) forming an enriched mercury isotope in said reactor in the form of mercury compounds;
   (c) providing a first segmented level of a suitable electrolyte solution to said reactor, said electrolyte solution being capable of dissolving said mercury compounds formed in a first segmented level of said reactor;
   (d) dissolving said mercury compounds in said first segmented level of said reactor with said electrolyte solution to form a saturated solution;
   (e) recovering said mercury from said electrolyte solution by removing said electrolyte solution;
   (f) providing a second segmented level of a suitable electrolyte solution to said reactor, said electrolyte solution being capable of dissolving said mercury compounds formed in a second segmented level of said reactor; said second segmented level of electrolyte solution being higher in said reactor than said first segmented level of electrolyte solution;
   (g) dissolving said mercury compounds in said second segmented level of said reactor with said electrolyte solution to form a saturated solution;
   (h) recovering said mercury from said electrolyte solution by removing said electrolyte solution; and
   (i) repeating the steps (c)–(h) until substantially all of the enriched mercury formed in said reactor has been recovered.

* * * * *